United States Patent [19]
Finkelstein et al.

[11] Patent Number: 4,479,166
[45] Date of Patent: Oct. 23, 1984

[54] HIGH TEMPERATURE ELECTROLYTIC CAPACITOR

[75] Inventors: Manuel Finkelstein, North Adams; Franz C. Dunkl; Sidney D. Ross, both of Williamstown, all of Mass.

[73] Assignee: Sprague Electric Company, North Adams, Mass.

[21] Appl. No.: 399,165

[22] Filed: Jul. 19, 1982

Related U.S. Application Data

[63] Continuation-in-part of Ser. No. 306,994, Sep. 30, 1981, Pat. No. 4,373,177.

[51] Int. Cl.³ .............................................. H01G 9/00
[52] U.S. Cl. .................................... 361/433; 252/62.2
[58] Field of Search ........................ 361/433; 252/62.2

[56] References Cited

U.S. PATENT DOCUMENTS

| | | | |
|---|---|---|---|
| 3,547,423 | 12/1970 | Jenny et al. | 317/230 |
| 3,609,467 | 9/1971 | Curtis | 317/230 |
| 4,117,531 | 9/1978 | Ross | 252/62.2 |
| 4,377,692 | 3/1983 | Barry | 252/62.2 |

FOREIGN PATENT DOCUMENTS

| | | | |
|---|---|---|---|
| 839159 | 4/1970 | Canada | 31/45 |
| 45-40240 | 12/1970 | Japan . | |

*Primary Examiner*—John F. Niebling

[57] ABSTRACT

A high-temperature aluminum electrolytic capacitor contains an electrolyte of a salt of tert.butylamine and adipic acid in a 1.3 to 2.0 amine:acid molar ratio, a phosphate salt, and water dissolved in ethylene glycol to provide a capacitor capable of operating at least at 200 VDC and 130° C.

5 Claims, 2 Drawing Figures

HIGH TEMPERATURE ELECTROLYTIC CAPACITOR

CROSS-REFERENCE TO RELATED APPLICATION

This application is a continuation-in-part of application Ser. No. 306,994, filed Sept. 30, 1981 now U.S. Pat. No. 4,373,177 issued Feb. 8, 1983.

BACKGROUND OF THE INVENTION

This invention relates to an aluminum electrolytic capacitor capable of operation at 200 VDC or higher at an ambient temperature of 130° C. through the use of an electrolyte containing a tert.butylammonium adipate corresponding to an amine:acid molar ratio of 1.3 to 2.0:1 as solute, and a phosphate salt and water dissolved in ethylene glycol as solvent.

Heretofore, electrolytes for aluminum electrolytic capacitors operating at 200V or higher most commonly contained salts of boric acid or boric acid derivatives as the solute in ethylene glycol as solvent. The maximum operating temperature for such an electrolyte system is less than 100° C. and normally 65°–85° C. The temperature limitation is due to the facile reaction of glycol with boric acid and other borate species to form polymeric glycolborates and water. The minimum operating temperatures are above −20° C. inasmuch as glycol freezes at −17.4° C.

The effective temperature operating range of aluminum electrolytic capacitors of the prior art has been expanded in both directions by replacing the glycol solvent with N,N-dimethylformamide (DMF) which has a boiling point of 153° C. and a freezing point of −61° C. There are known prior art DMF electrolytes that can be effectively used over the temperature range −55° C. to +125° C. However, DMF is a very agressive solvent and attacks most materials of construction. The most resistant material for sealing gaskets and O-rings is Butyl rubber. Unfortunately, DMF will be transmitted through a Butyl rubber closure at a rate that increases with increasing temperature, thus limiting the life of the capacitor since the capacitors will not function adequately when approximately one-half the solvent has been lost.

DMF also has a flash point of 67° C. making it undesirable for use as solvent in capacitors that are to be used in confined spaces. In contrast, glycol has a boiling point of 197.2° C. and a flash point of 116° C. and is much easier to contain. Rates of transmission of glycol through both Butyl rubber and ethylene-propylene rubber (EPR) are almost negligible.

For current power supply operations, it is desirable to provide an aluminum electrolytic capacitor capable of operating continuously at 200 VDC or higher at an ambient temperature of 130° C. with modest low temperature properties.

It would be desirable to use ethylene glycol as solvent for the reasons given above. If glycol is used, then the solute cannot be boric acid or a borate because of its reaction with glycol as described above. The solute should be one that will not react with glycol or any other cosolvent that might be used. The solute must also be stable at operating temperatures of 130° C., and at somewhat higher temperatures.

The major cause of resistivity increase in an electrolyte is amide formation particularly where the solute is an ammonium or substituted ammonium salt of a dicarboxylic acid. For example, diammonium adipate, a known solute for electrolytic capacitor electrolytes, will rapidly form adipamide, a non-conducting species, at 125° C. when used in an ethylene glycol solvent. Since adipamide is insoluble in glycol, this reaction is readily detected. For other salts that undergo amide formation but form soluble amides, the reaction can be detected by increases in resistivity. Amide formation proceeds most readily with ammonium salts, and more readily with salts of primary amines than with salts of secondary amines. Amide formation is most difficult with salts of tertiary amines, as a carbon-nitrogen bond must be broken for it to proceed.

SUMMARY OF THE INVENTION

An aluminum electrolytic capacitor capable of continuous operation at 200 VDC or higher and 130° C. is provided by the use of an electrolyte system of a tert.butylammonium adipate having an amine:acid molar ratio of from 1.3:1 to 2.0:1 as solute, a phosphate salt, and water dissolved in ethylene glycol as solvent.

DESCRIPTION OF THE PREFERRED EMBODIMENTS

Figure 1:
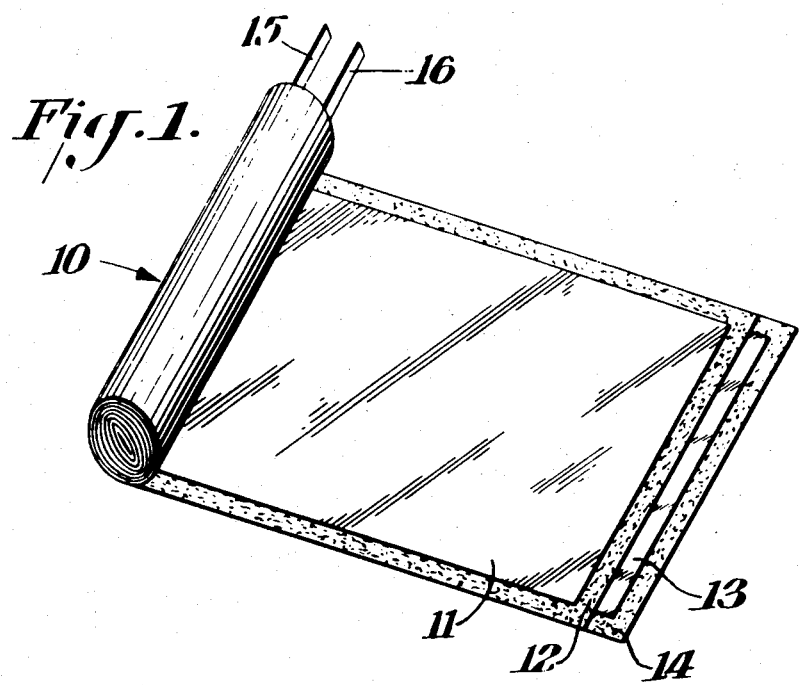
FIG. 1 shows a wound capacitor section partially unrolled.

Referring to FIG. 1, wound capacitor section 10 consists of anode foil 11 of aluminum having on its surface an insulating oxide barrier layer. Cathode foil 13 is also aluminum. Electrolyte absorbent layers 12 and 14, preferably paper, are positioned between the anode foil 11 and cathode foil 13 and interwound therewith. Tabs 15 and 16 are connected to electrodes 11 and 13, respectively, to provide for connection of the electrodes to leads. When completely wound, section 10 is impregnated with an electrolyte (not shown) of this invention.

Figure 2:
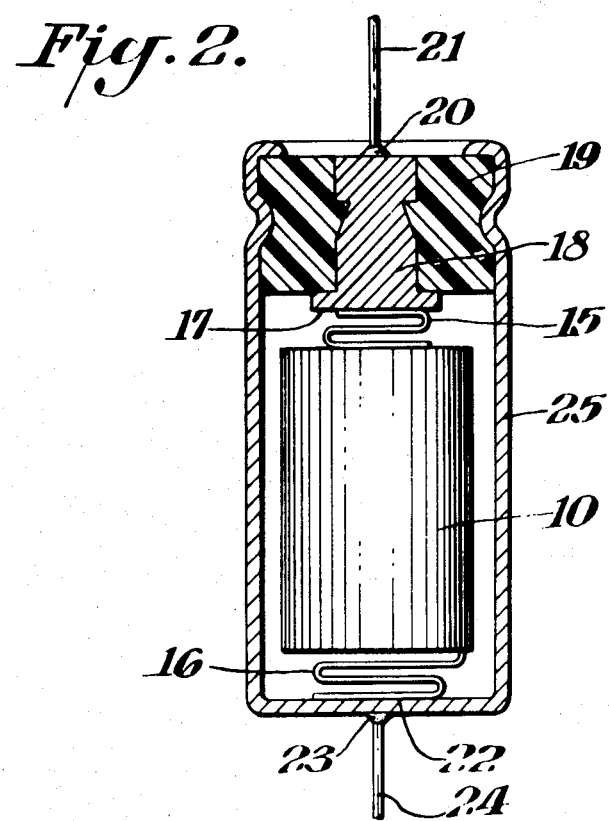
FIG. 2 is a cross-section of a capacitor containing a wound section.

FIG. 2 shows a cross-section of an axial capacitor in which the cathode tab 16 of capacitor section 10 is welded at 22 to housing 25 and via weld 23 to cathode lead 24. Anode tab 15 is welded to portion 17 of insert 18 positioned in bushing 19 and welded at 20 to anode lead 21. Electrolyte (not shown) impregnates section 10.

The electrolyte is a solution in ethylene glycol of a tert.butylammonium adipate containing 1.3 to 2.0 moles of amine per mole of acid, a phosphate salt, and water.

As pointed out earlier, for operation at 130° C., the electrolyte must be stable at 130° C. and preferably stable at somewhat higher temperatures. For this reason, 150° C. was chosen for the stability screening test.

The desired room-temperature resistivity of the electrolyte depends on the voltage rating of the capacitor and the operating temperatures to which the capacitor will be subjected. For 200 VDC capacitors operating at 130° C., the room-temperature resistivity should be at least 600 Ω-cm and preferably 600–750 Ω-cm; this resistivity should increase to no more than 1200 Ω-cm after 1000 hr. at 150° C. For higher voltage capacitors, electrolytes with higher resistivities should be employed; and for lower voltage capacitors, electrolytes with lower resistivities.

The electrolyte must have a maximum anodization voltage at least equal to the rated voltage of the capacitor at the operating temperature, i.e. at least 200 V at 130° C. for a 200 V capacitor, to be able to reform damaged barrier oxide layer on the anode foil during operation. In a commercial device, one would generally specify that this voltage be 25-50% higher than the operating voltage. For operating voltages of 200 V and higher, it has been found that a phosphate salt must be included in these electrolytes to insure continuous operation.

Thirteen different salts, ammonium or substituted-ammonium, were evaluated in a thermal stability screening test conducted at various temperatures ranging from 105° C. to 150° C. The test involves measuring the room-temperature resistivity of the electrolytes, sealing samples of the electrolytes in glass tubes, and heating the sealed tubes to the test temperature. At approximately 500 hour intervals, samples are withdrawn and cooled to room temperature; the resistivity is measured at room temperature. Of the 13 salts tested, 7 gave electrolytes that were satisfactory at 150° C.

The seven satisfactory salts included bis(tert.butylammonium) adipate, a di-salt; N-ethylpiperidinium and N-n-butylpiperidinium salts, two salts that had fairly complicated syntheses; diethyl- and trimethylammonium salts that subsequently proved unsatisfactory at the desired voltages; and the di-n-propylammonium and diisopropylammonium mono salts.

The di-salt of this invention performed very well in the high-temperature stability screenings, even though it was made from a primary amine and some amide formation was indicated from the resistivity increase. The stability may be a result of the high degree of branching in the tert.butyl group with steric hindrance lessening amide formation.

Generally when adipic acid is treated with two or more moles of an amine, the product is the monoamine salt rather than the bisamine salt. This is the experience in the reactions with piperidine, diethylamine, methylamine, dimethylamine, diisopropylamine and N-ethylpiperidine, all of which amines provide the monoamine salt, the substituted-ammonium hydrogen adipate.

Exceptions to this generalization are provided by the reactions of adipic acid with ammonia and with tert.butylamine. When adipic acid is reacted with two or more moles of ammonia, diammonium adipate is obtained in quantitative yield. However, if one reacts adipic acid with one mole of ammonia one can obtain ammonium hydrogen adipate as a pure crystalline salt. When adipic acid is reacted with two or more moles of tert.butylamine, bis-tert.butylammonium adipate is obtained in quantitative yield, but in this case it is not possible to obtain the mono-tert.butylammonium adipate as a pure crystalline compound. When one reacts 0.5 mole of adipic acid with 0.5 mole of tert.butylamine in methanol one obtains first 0.19 mole of the bis-salt, m.p. 185°-187° d. The second crop, 35.4 g, m.p. 91°-135°, might represent 0.17 mole of the crude mono-salt, but on recrystallization to effect purification the only pure compound isolated is the bis-salt. When one reacts 0.50 mole of adipic acid with 0.27 mole of tert.butylamine the product is 61.2 g of salt having m.p. 91°-101°, which cannot be pure mono-salt since this weight of product would represent a yield greater than 100%. Analysis for nitrogen gave 5.52% whereas the pure mono-salt would have 6.76% nitrogen. The product is, therefore, a mixture of mono-salt and adipic acid.

Again all attempts to purify this product by crystallization gave only the bis-salt, and it is clear that in this case the bis-salt is so much less soluble than any other possible product that recrystallization always results in its precipitation except when a large excess of adipic acid is present. For a more detailed discussion of the amine salts of dibasic acids, both normal and anomalous, see J. E. Barry, M. Finkelstein and S. D. Ross, J. Org. Chem. 47, 64 (1982).

Finally it should be stressed that the foregoing discussion of the composition of the salts of adipic acid applies only to the composition of the salts in the solid state. In solution one can have the monosalt, the bis-salt and mixtures thereof, depending on the molar ratios of adipic acid to tert.butylamine. The actual amounts of individual species present will be governed by the equilibria indicated below:

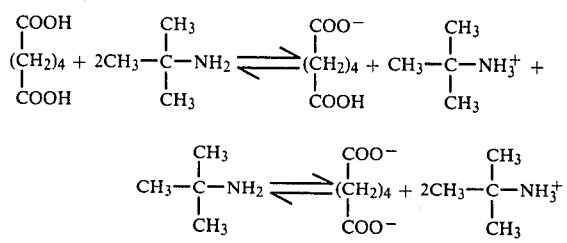

Thus one can obtain both the mono- and bis-salts in solution by mixing adipic acid and tert.butylamine, in situ, in an appropriate solvent. An electrolyte was prepared in-situ using an excess of amine over that required stoichiometrically for the mono salt. This electrolyte was found to have superior high temperature and electrical properties also; this is the electrolyte of Example 2.

EXAMPLE 1

This example gives the electrical properties of the di-salt, bis(tert.butylammonium) adipate. It was prepared from 2 moles of amine and 1 mole of adipic acid in acetonitrile. Its melting point was 175°-185° C., and the nitrogen content calculated for the bis-salt was 9.58% and 9.46% was found. A formulation of 80 wt. % ethylene glycol, 5 wt. % water, 0.5 wt. % ammonium dihydrogen phosphate, and 15 Wt. % bis-tert.butylammonium adipate had a 25° C. resistivity of 741 Ω-cm, a 25° C. maximum anodization voltage on boiled foil of 450 V. After 3067 hr. at 150° C., the 25° C. resistivity was 1037 Ω-cm.

EXAMPLE 2

An electrolyte formulated from 82.0 wt. % ethylene glycol, 7.4 wt. % adipic acid, 5.0 wt. % tert.butylamine (a mole ratio of 1.38:1 amine to acid), 5.0 wt. % water, and 0.5 wt. % ammonium dihydrogen phosphate has the following characteristics: a pH of 5.95, boiling point of 150°-152° C., a resistivity at 25° C. of 680 Ω-cm, at 125° C. of 76 Ω-cm, and at −40° C. of 64,200 Ω-cm, and a maximum anodization voltage on boiled foil at 25° C. of 428 V.

Twenty-five capacitors rated at 50 μF and 200 VDC were life-tested at 200 VDC and 130° C. The table below gives average results for these capacitors containing the electrolyte of Example 2. Capacitance is in microfarads, leakage current is microamperes, and weight loss, a measure of stability, in milligrams.

TABLE

| Hours | 120 Hz Capacitance | ESR | Leakage Current 2 min | 5 min | Wt. Loss |
|---|---|---|---|---|---|
| 0 | 56.0 | 0.84 | 4.05 | 2.17 | — |
| 424 | 54.6 | 0.64 | 2.43 | 1.28 | 18.2 |
| 1000 | 54.6 | 0.68 | 2.22 | 1.02 | 38.9 |
| 1430 | 54.2 | 0.68 | 2.90 | 1.30 | 52.8 |
| 1572 | 54.5 | 0.68 | 2.29 | 1.02 | 57.7 |
| 2000 | 54.3 | 0.67 | 2.32 | 1.04 | 71.9 |
| 2500 | 54.3 | 0.68 | 1.94 | 0.91 | 89.6 |
| 3000 | 53.9 | 0.67 | 2.58 | 1.10 | 104.2 |
| 3500 | 54.0 | 0.68 | 2.15 | 1.04 | 120.7 |
| 4000 | 53.8 | 0.69 | 2.36 | 1.05 | 137.0 |
| 4500 | 53.7 | 0.69 | 2.21 | 0.97 | 152.4 |
| 5000 | 53.2 | 0.68 | 2.78 | 1.25 | 167.4 |
| 5500 | 53.7 | 0.72 | 1.96 | 0.95 | 181.4 |

The rate of weight loss is a useful predictor of the ultimate life of a capacitor. A rule-of-thumb is that when a capacitor loses 40-50% of its electrolyte, it starts to deteriorate electrically and becomes a risk. For example, for a capacitor containing 2000 mg of electrolyte, a weight loss rate of 100 mg/1000 hrs. would predict that the capacitor would lose 40-50% of its electrolyte, or 800-1000 mg, in 8000-10,000 hrs. At this point the capacitor would be predicted to start to deteriorate and go off-specification electrically. The capacitors shown above do contain 2000 mg of electrolyte, and, from the data above, a life of 15,000-30,000 hrs. is predicted before reaching the 40-50% (or 800-1000 mg) wt. loss. Since these values are for 130° C. operation, these are extremely stable capacitors.

EXAMPLE 3

In this example, the effect of a phosphate salt on electrolyte performance is shown. A different formulation was made in a 1.3:1 amine:acid ratio from 25.0 g adipic acid, 16.7 g tert.butylamine, 67.6 g of water, and 1000 ml of ethylene glycol, with and without 3.7 g of ammonium dihydrogen phosphate. This electrolyte was tested in 10 $\mu$F-450 V capacitors at 85° C. for 1 hr. at 400 V, 1 hr. at 450 V and 2 hr. at 475 V. For these higher voltage capacitors, electrolytes with higher resistivities were needed; the version without phosphate (electrolyte 2b) had a room-temperature resistivity of about 1700 $\Omega$-cm while that with phosphate (electrolyte 2a), about 1400 $\Omega$-cm. The maximum formation voltages were 490 V and 510 V, respectively.

TABLE

| Electrolyte | No. shorts/No. capacitors | Leakage current, $\mu$A |
|---|---|---|
| 2a | 1/10 | 149.9 |
| 2b | 10/10 | — |

The non-phosphate version failed completely. However, when the same phosphate was added to a conventional low voltage electrolyte containing ammonium adipate, water, and ethylene glycol formulated for 6 V service, the presence of a phosphate had a detrimental effect on the electrical properties of the tested capacitors. Leakage currents for the non-phosphate vs phosphate version were 58 and 65 $\mu$A, respectively initially. At 250 hrs. the leakage current values were 230 vs 727 $\mu$A, and at 500 hrs. the values were 362 vs 762 $\mu$A.

Thus, while the presence of phosphate is necessary for the electrolytes of the present invention, it is not beneficial to all adipate electrolytes. While ammonium dihydrogen phosphate has been used in the examples, other phosphate salts may be used providing they have sufficient solubility.

EXAMPLE 4

A series of electrolyte formulations were made in which the tert.butylamine to adipic acid molar ratio was varied from 1:1 (mono salt) to 2:1 (di-salt). The electrical properties are given below.

TABLE

| Amine:Acid ratio | 1.0 | 1.25 | 1.38 | 1.5 | 1.75 | 2.0 |
|---|---|---|---|---|---|---|
| Boiling pt, °C. | 152 | 151 | 151 | 150 | 148 | 146 |
| Resistivity, 25° C., $\Omega$-cm | 811 | 733 | 686 | 680 | 642 | 624 |
| $V_{MAX}$, 25° C. (boiled foil) | 230 | 238 | 428 | 428 | 423 | 419 |

There is a sharp change in maximum anodization voltage at above a 1.25 amide:acid molar ratio, and the data show this to have occurred between 1.25 and 1.3 moles of amine:acid.

Generally, a capacitor electrolyte should have a room-temperature maximum anodization voltage approximately 25-50% higher than the rated voltage of the capacitor. Thus, the first two electrolytes in the preceeding Table would be suitable for capacitors rated up to 175 VDC, but not for the 200 VDC or higher capacitors of the present invention.

What is claimed is:

1. A high-temperature aluminum electrolytic capacitor comprising two aluminum electrode foils, one of said foils bearing a barrier layer dielectric oxide, interleaved spacers wound throughout the length of said foils in contact with an electrolyte consisting essentially of ethylene glycol as solvent, water, a phosphate ion source, and as solute a tert.butylammonium adipate corresponding to 1.3 to 2.0 moles of tert.butylamine per mole of adipic acid, thereby providing a capacitor capable of operating at 200 VDC or higher and at 130° C., said electrolyte having a room-temperature resistivity of at least 600 $\Omega$-cm.

2. A capacitor according to claim 1 wherein said electrolyte is formulated from 1.33 to 1.38 moles of amine per mole of acid.

3. A capacitor according to claim 2 wherein said electrolyte is formulated from 82 wt. % glycol, 0.5 wt. % phosphate, 5.0 wt. % water, 5.0 wt. % tert.butylamine, and 7.4 wt. % adipic acid and said resistivity is 680 $\Omega$-cm.

4. A capacitor according to claim 2 wherein said electrolyte is formulated from 90.8 wt. % glycol, 0.3 wt. % phosphate, 5.5 wt. % water, 1.4 wt. % tert.butylamine, and 2.0 wt. % adipic acid and said resistivity is 1400 $\Omega$-cm.

5. A capacitor according to claim 1 wherein said electrolyte contains 80 wt. % ethylene glycol, 5 wt. % water, 0.5 wt. % phosphate, and 15 wt. % bis-(tert.butylammonium) adipate and said resistivity is 741 $\Omega$-cm.

* * * * *